United States Patent
Rugar et al.

(10) Patent No.: US 12,550,635 B2
(45) Date of Patent: Feb. 10, 2026

(54) CONTROLLING TLS VIA ON-CHIP FILTERING TO PREVENT QUBIT ENERGY LOSS

(71) Applicant: International Business Machines Corporation, Armonk, NY (US)

(72) Inventors: Daniel Rugar, Los Altos, CA (US); Harry Jonathon Mamin, Palo Alto, CA (US); Jiri Stehlik, New York, NY (US); Timothy Phung, Milpitas, CA (US); Robert M. Shelby, Boulder Creek, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 373 days.

(21) Appl. No.: 18/318,850

(22) Filed: May 17, 2023

(65) Prior Publication Data

US 2025/0280741 A1    Sep. 4, 2025

(51) Int. Cl.
*H10N 60/80* (2023.01)
*G06N 10/40* (2022.01)
(Continued)

(52) U.S. Cl.
CPC .............. *H10N 99/05* (2023.02); *G06N 10/40* (2022.01); *H10N 60/12* (2023.02); *H10N 60/805* (2023.02)

(58) Field of Classification Search
CPC ....................................................... G06N 10/40
See application file for complete search history.

(56) References Cited

U.S. PATENT DOCUMENTS

| | | |
|---|---|---|
| 9,059,388 B2 | 6/2015 | Tahan et al. |
| 9,524,470 B1 | 12/2016 | Chow et al. |

(Continued)

FOREIGN PATENT DOCUMENTS

| | | | |
|---|---|---|---|
| JP | 2004014977 A | | 1/2004 |
| WO | 2022201253 A1 | | 9/2022 |
| WO | WO2023129637 | * | 7/2023 |

OTHER PUBLICATIONS

Lisenfeld, et al., "Enhancing the Coherence of Superconducting Quantum Bits with Electric Fields", Quantum Physics, Aug. 2, 2022, arXiv:2208.01570v1, https://arxiv.org/abs/2208.01570, https://arxiv.org/pdf/2208.01570.pdf.

(Continued)

*Primary Examiner* — Matthew L Reames
(74) *Attorney, Agent, or Firm* — Amin, Turocy & Watson, LLP

(57) ABSTRACT

Systems and techniques that facilitate controlling TLS via on-chip filtering to prevent qubit energy loss are provided. In various embodiments, a system can comprise a quantum device including a qubit device on a substate. In various embodiments, the quantum device can include an electrode placed in proximity to the qubit device. In various embodiments, an electrical filter can be connected to the electrode. In various embodiments, the quantum device can comprise a voltage source that can be connected to the electrode via the electrical filter. In various embodiments, the voltage source can control a voltage to the electrode to shift a resonant frequency of one or more defects to reduce two level system (TLS) impact on the qubit device.

21 Claims, 7 Drawing Sheets

(51) Int. Cl.
*H10N 60/12* (2023.01)
*H10N 99/00* (2023.01)

(56) References Cited

U.S. PATENT DOCUMENTS

| | | |
|---|---|---|
| 10,755,191 B2 | 8/2020 | Tahan et al. |
| 11,482,656 B2 | 10/2022 | Neill et al. |
| 2020/0265334 A1 | 8/2020 | Haider et al. |
| 2022/0222564 A1 | 7/2022 | Kubota et al. |
| 2022/0374755 A1 | 11/2022 | Didier |
| 2025/0103939 A1* | 3/2025 | Lisenfeld ............... G06N 10/70 |

OTHER PUBLICATIONS

Lisenfeld, et al., "Electric field spectroscopy of material defects in transmon qubits," npj Quantum Information vol. 5, Article No. 105, Published: Nov. 22, 2019, https://www.nature.com/articles/s41534-019-0224-1.

Phillips, "Tunneling states in amorphous solids," Journal of Low Temperature Physics vol. 7, pp. 351-360, Published: May 1972, doi:10.1007/bf00660072.

Phillips, "Two-level states in glasses," Rep. Prog. Phys. 50 1657, No. 12, (1987), DOI 10.1088/0034-4885/50/12/003.

Müller, et al., "Towards understanding two-level-systems in amorphous solids: insights from quantum circuits," Rep. Prog. Phys. 82 124501, No. 12, Published Oct. 30, 2019, DOI 10.1088/1361-6633/ab3a7e.

* cited by examiner

CONTROLLING TLS VIA ON-CHIP FILTERING TO PREVENT QUBIT ENERGY LOSS

TECHNICAL FIELD

The present disclosure relates to controlling two level system (TLS) defects to prevent qubit energy loss within a quantum device to increase performance of related quantum devices, and further, controlling TLS with a voltage supplied via on-chip filtering.

BACKGROUND

Operations on qubits generally introduce some error in quantum systems, such as some level of decoherence and or some level of quantum noise affecting qubit availability. Such errors can include quantum noise generated by defects called two level systems (TLS). In the present context, the term TLS can refer generally to any material defect that can interact with a qubit and has a characteristic frequency that can be manipulated by an applied electric field. A T1 (energy relaxation time) of a qubit can fluctuate in time due to TLSs. TLSs can cause T1 relaxation times to be shorter than expected, leading to decreases in the coherence times of quantum systems. In addition to TLS, T1 relaxation times can be negatively affected by energy leakage to the environment, an effect called Purcell loss. Decreases in the relaxation and coherence times of quantum systems can limit the ability of the quantum system to perform long quantum algorithms and can increase the error rate of quantum gate operations.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system can comprise a quantum device, an electrode, an electrical filter, and a voltage source. The qubit device can be on a substrate and the electrode can be placed in proximity to the qubit device. Further, the electrical filter can be connected to the electrode, and the voltage source can be connected to the electrode via the electrical filter. The voltage source can control a voltage to the electrode to shift a resonant frequency of the one or more defects to reduce two level system (TLS) impact on the qubit device.

In one or more embodiments of the aforementioned system, the electrical filter can comprise a filter tuned to reflect signals at a frequency of a transmon qubit of the qubit device. In one or more embodiments of the aforementioned system, the voltage supplied by the voltage source to the electrode can be adjusted to improve the performance of the qubit device. Further, in one or more embodiments, the qubit device can be flux-tunable and the electrical filter can be within $\lambda/4$ of the electrode. The electrical filter can be comprised of superconducting materials.

An advantage of the above-indicated system can be providing for enhanced or recovered qubit performance by applying an electric field to tune the TLS resonant frequency. The presence of the electrode in proximity to the qubit can result in leakage of energy from the qubit to the electrode. In this way, providing a filter near the electrode can be to avoid loss of qubit energy (e.g., Purcell loss) to the voltage source or to the surrounding environment.

According to another embodiment, a device can comprise a transmon qubit, an electrode, an electrical filter, and a voltage source. The transmon qubit can be on a substrate and the electrode can be placed in proximity to the transmon qubit. Further, the electrical filter can be connected to the electrode, and the voltage source can be connected to the electrode via the electrical filter. The transmon qubit can be disposed on a first surface, and the electrode can be disposed on a second surface.

In one or more embodiments of the aforementioned device, the first surface and the second surface can be on opposite sides of the substrate. In one or more embodiments of the aforementioned device, the second surface can be on a second substrate. The electrical filter can be disposed on the second surface.

In one or more embodiments of the aforementioned device, the electrode can be aligned in at least one direction with the transmon qubit. In one or more embodiments of the aforementioned device, the electrical filter can be disposed on a third surface of the second substrate, and wherein the second surface and the third surface can be on opposite sides of the second substrate.

In one or more embodiments of the aforementioned device, the electrical filter can be within $\lambda/4$ of the electrode, and the transmon qubit can be flux-tunable. Additionally, the transmon qubit can be flux-tunable. The electrical filter can comprise a filter tuned to reflect signals at a frequency of the transmon qubit.

An advantage of the above-indicated device can be providing for enhanced or recovered qubit performance by applying an electric field to tune the TLS resonant frequency. The presence of the electrode in proximity to the qubit can result in leakage of energy from the qubit to the electrode. In this way, providing a filter near the electrode can be to avoid loss of qubit energy (e.g., Purcell loss) to the voltage source or to the surrounding environment.

According to another embodiment, a method can comprise adjusting a voltage connected to an electrode to shift a resonant frequency of one or more defects to reduce two level system (TLS) impact on the qubit device. The electrode can be located in proximity to the qubit device and a filter can be located between the voltage and the electrode. In embodiments, the filter can be located on a same substrate as the electrode.

In one or more embodiments of the aforementioned method, the method can comprise measuring a performance of the qubit device. Additionally, the method can comprise adjusting the voltage supplied to the electrode, via a voltage source, to improve the performance of the qubit device. With embodiments, the performance can comprise a Gate Error Rate. In further embodiments, the performance can comprise a T1 time.

In one or more embodiments of the aforementioned method, the method can comprise improving the performance of the qubit device by: applying, via the voltage source, a sweep of voltage on the electrode over a range via a plurality of small voltage steps; measuring a T1 value of the qubit device as a function of the voltage applied by the voltage source; determining an optimal voltage value that produced a maximum value for the T1 value for the qubit device; and setting the voltage of the electrode to the optimal voltage value.

In one or more embodiments of the aforementioned method, the method can comprise improving the performance of the qubit device by: applying, via a voltage source, a sweep of voltage on the electrode over a range via a plurality of small voltage steps; measuring a gate error rate of the qubit device as a function of the voltage applied by the voltage source; determining an optimal voltage value that produced a minimum gate error rate for the qubit device; and setting the voltage of the electrode to the optimal voltage value.

An advantage of the above-indicated method can be providing for enhanced or recovered qubit performance by applying an electric field to tune the TLS resonant frequency. The presence of the electrode in proximity to the qubit can result in leakage of energy from the qubit to the electrode. In this way, providing a filter near the electrode can be to avoid loss of qubit energy (e.g., Purcell loss) to the voltage source or to the surrounding environment.

DETAILED DESCRIPTION

Figure 1:
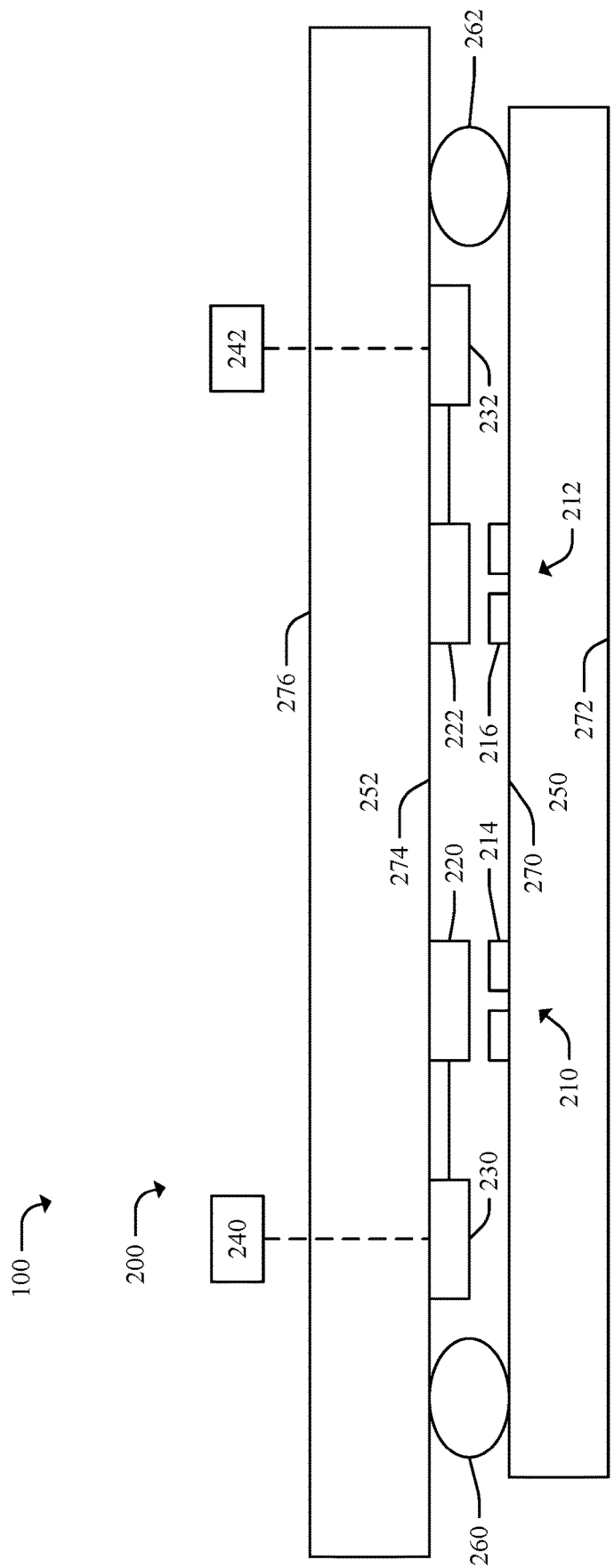
FIG. 1 illustrates a diagram of an example, non-limiting on-chip filtering system that can facilitate preventing qubit energy loss in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, a quantum circuit can be a set of operations, such as gates, performed on a set of real-world physical qubits with the purpose of obtaining one or more qubit measurements. A quantum processor can comprise the one or more real-world physical qubits.

Qubit states only can exist (or can only be coherent) for a limited amount of time. Thus, an objective of operation of a quantum logic circuit (e.g., including one or more qubits) can be to maximize the coherence time of the employed qubits. Time spent to operate the quantum logic circuit can undesirably reduce the available time of operation on one or more qubits. This can be due to the available coherence time of the one or more qubits prior to decoherence of the one or more qubits. For example, a qubit state can be lost in less than 100 to 200 microseconds in one or more cases.

Operation of the quantum circuit can be facilitated, such as by a waveform generator, to produce one or more physical pulses and/or other waveforms, signals and/or frequencies to alter one or more states of one or more of the physical qubits. The altered states can be measured, thus allowing for one or more computations to be performed regarding the qubits and/or the respective altered states.

Operations on qubits generally can introduce some error, such as some level of decoherence and/or some level of quantum noise, further affecting qubit availability. Quantum noise can refer to noise attributable to the discrete and/or probabilistic natures of quantum interactions.

A T1 (energy relaxation time) of a qubit can fluctuate in time. One source of the fluctuations can be the noise at the qubit frequency that varies in time. One type of such quantum noise can be due to defects called two level systems (TLS). TLSs are quantum mechanical defects that can exist in amorphous materials such as glasses or disordered solids. In such amorphous materials, the atoms or molecules are not arranged in a periodic crystal structure but are instead arranged randomly. Such random disorder creates a distribution of potential energy minima and maxima that TLSs can occupy.

Additionally, the density of TLSs in a material depends on its preparation and history. For instance, the density of TLSs in glasses can be reduced by annealing the glass at high temperatures. However, the annealing process is not always effective and can also create new TLSs. The density of TLSs can also vary depending on the cooling rate and the pressure at which the material was formed.

Further, TLSs can affect the performance of quantum circuits by introducing fluctuations or local variations in the energy landscape, leading to errors in quantum gate operations. These variations can trap charge carriers, for example, leading to fluctuations in the energy landscape that affect the performance of quantum circuits. The TLS errors can be characterized by the T1, which measures the rate at which quantum information is lost due to relaxation to the ground state.

TLSs can cause T1 relaxation times to be shorter than expected, leading to a decrease in the coherence time of quantum systems. This decrease in coherence time can limit the ability to perform long quantum algorithms and increase the error rate of quantum gate operations.

A two-level system has a transition energy (or corresponding frequency). When a TLS is resonant with the qubit frequency, the rate of energy relaxation can increase, leading to shorter T1. TLS frequencies can change as a function of time due to spontaneous changes in the local electric field environment of the TLS. Such changes in the local electric field environment can cause an excellent qubit to suddenly become a poorly functioning qubit (e.g., low T1 times). With examples, an excellent qubit with a T1 time of 500 microseconds can suddenly become a poorly functioning qubit with a T1 time of less than 50 microseconds. With further examples, high performing superconducting qubits can have T1 times greater than 100 microseconds where Purcell loss can affect qubit performance.

A two-level system (TLS), among other noise causes, can comprise a source of noise that can cause deterioration of coherence parameters (e.g., shorter T1) of one or more qubits of a quantum logic circuit. TLSs are believed to be able to coherently or incoherently couple to the qubit leading to either faster energy relaxation times or rate of energy decay (e.g., shorter T1 s corresponding to an exponential 1/e decay time) as well as faster phase decoherence (e.g., T2). That is, the noise can couple to a low-energy thermal fluctuator, for example, which can randomly change the TLS energy resonance (or the equivalent frequency of the TLS resonance). A TLS can spectrally diffuse into and out of resonance with the qubit frequency when the TLS is in the vicinity of a qubit frequency. This is a source of T1 fluctuation.

The qubit frequency is the resonance frequency of a qubit energy transition between two states such as, but not limited to, the ground and first excited states of the qubit. The vicinity of a qubit frequency is a frequency range which in some embodiments can range from about 10 megahertz (MHz) below the qubit frequency to about 10 MHz above the qubit frequency. In other embodiments, the vicinity of a qubit frequency can range from about 100 MHz below the qubit frequency to about 100 MHz above the qubit frequency. In still other embodiments, the vicinity of a qubit frequency can range from about 1 gigahertz (GHz) below the qubit frequency to about 1 GHz above the qubit frequency. Without being limited to theory, it is believed that such two-level systems can be caused by atomic scale defects in surface oxides on the metals and/or on the substrate material of a physical real-world qubit and can be electromagnetically active. Indeed, a qubit, such as a transmon itself is a resonator with an electromagnetic excitation, and thus a qubit excitation can couple with a two-level system (TLS) and can cause performance issues for a quantum logic circuit, such as, but not limited to, deterioration of qubit parameters, such as qubit gate error rate.

Due to presence of two-level systems in/at the quantum system and/or due to maintenance and/or diagnostics to be performed relative to coherence times of a particular qubit, one or more qubits, such as superconducting qubits, can be unavailable and/or not recommended for use with the quantum logic circuit, even if desired for use. Furthermore, absent understanding of such two-level systems and their associated fluctuations relative to the frequency domain of one or more qubits of a quantum system, coherence of the qubit can be affected. Loss of coherence can cause failure of execution of a quantum circuit.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. In one or more described embodiments, computer and/or computing-based elements can be used in connection with implementing one or more of the systems, devices, components and/or computer-implemented operations shown and/or described in connection with FIGS. 1-3 and/or with other figures described herein.

Turning first generally to FIG. 1, one or more embodiments described herein can include one or more devices, systems and/or apparatuses that can facilitate on-chip filtering to prevent qubit energy loss due to TLS defects. For example, FIG. 1 illustrates a diagram of an example, non-limiting, on-chip filtering system 100 that comprises a quantum device 200 having a qubit device 210, an electrode 220, and an electrical filter 230. The non-limiting, on-chip filtering system 100 to prevent qubit energy loss can additionally include a voltage source 240 connected to the electrode 220 via the electrical filter 230. The qubit device 210 can be fabricated on a substrate 250 and the electrode 220 can be disposed in proximity (e.g., a distance in which a target qubit can be adjusted without substantially impacting an untargeted qubit) to the qubit device 210. Further, the voltage source 240 can supply voltage to the electrode 220 to shift a resonant frequency of one or more defects to reduce TLS impact on the qubit device 210.

With embodiments, such as generally illustrated in FIG. 1, the non-limiting, on-chip filtering system 100 to prevent qubit energy loss can apply an electric field via the electrode 220 to recover and/or improve performance of the qubit device 210 (e.g., qubit T1 or qubit gate error rate). TLSs can include resonant frequencies which can coincide with the frequency of the qubit (e.g., a transmon qubit 214 of the qubit device 210). Further, TLS frequencies can wander/vary in time which can cause rapid reductions in qubit device 210 performance. Such performance can be recovered and/or improved by applying an electric field via the electrode 220. With examples, the electrode 220 can be disposed over (e.g., in the vertical direction, or in at least one direction) the qubit device 210. Further, the electrode 220 can provide a pathway for qubit energy to escape, which can be mitigated/blocked by including an electrical filter 230 (e.g., that additionally blocks outside energy from entering the qubit device 210). However, placing an electrode (e.g., the electrode 220) in proximity to transmon qubit 214 may result in energy leakage, such as Purcell loss, from the qubit.

In examples, the electrode 220 can be one or more of a variety of components that can generate/produce an electric field proximate a qubit device 210 to effectively tune the TLS defect frequency away from the qubit device 210 frequency. In an embodiment, the electrode 220 can be one or more loops of one or more wires, or one or more lines, whereby a common voltage can be applied to tune the frequency of the TLS defects, and such loops, wires, or lines may additionally be used in flux tuning of quantum components. In some embodiments, the electrode 220 can be a thin film of superconducting metal that is disposed in close proximity to the qubit device 210. For example and without limitation, the electrode 220 can be disposed apart from the qubit device 210 by about 50 micrometers or more or less. In examples, with an increase in the distance between the electrode 220 and the qubit device 210, the voltage can be respectively increased by the voltage source 240 to compensate for any decrease in the electric field generated by the electric voltage.

In embodiments, the electrical filter 230 can provide one or more of a variety of functions for the qubit device 210 and/or the on-chip filtering system 100. The electrical filter 230 can reflect qubit energy (e.g., energy lost through Purcell loss) back into the qubit device 210, and the electrical filter 230 can block outside energy/noise from entering and interfering with performance of the qubit device 210. Additionally, by placing the electrical filter 230 near (e.g., within a suitable distance to mitigate loss, such as λ/4 of the qubit device 210) the electrode 220, energy loss that occurs during signal propagation may be limited. In this way, performance of the qubit device 210 can be enhanced/improved by including an electrode 220 and an electrical filter 230 coupled with a voltage source 240 to provide a controlled electric field thereby controlling the frequency of one or more TLSs of the qubit device 210 and blocking external interferences and energy loss from the transmon qubit 214 itself. TLS defects include two energy levels where the difference in energy can determine the characteristic resonant frequency of the TLS. The TLS frequency can depend on the atomic configuration of the qubit materials and the presence of an electric field. TLS defects include an associated electric dipole moment that can allow for frequency tuning via an applied electric field. The electrode 220 can generate an electrical field via the voltage source 240 such that the frequency of the TLS defect can be tuned (e.g., tuned away from the qubit device 210 frequency).

Repetitive description of like elements employed in other embodiments described herein is omitted for sake of brevity. Aspects of systems (e.g., the on-chip filtering system 100 to prevent qubit energy loss and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

As illustrated in FIG. 1, the non-limiting, on-chip filtering system 100 to prevent qubit energy loss can include a first substrate 250 and a second substrate 252. The first substrate 250 can be disposed substantially parallel to the second substrate 252. The first substrate 250 can be one or more of a variety of qubit chips and can include the qubit device 210. Further, the qubit device 210 can be disposed on the first substrate 250. The first substrate 250 can include a first surface 270 and a second surface 272, where the first surface 270 can be opposite the second surface 272. The qubit device 210 can be disposed on the first surface 270 of the first substrate 250. The electrode 220 and the electrical filter 230 can be disposed on the second substrate 252 (see, e.g., FIG. 1). Further, the second substrate 252 can include a third surface 274 opposite a fourth surface 276. The second substrate 252 can be one or more of a variety of interposer chips; and the second substrate 252 can include ancillary circuitry for the on-chip filtering system 100 or for a variety of other connected systems.

Such as illustrated in FIG. 1, the on-chip filtering system 100 to prevent qubit energy loss can include an additional qubit device 212, an additional electrode 222, an additional electrical filter 232, and an additional voltage source 242. With embodiments, any number of qubit devices 210 can be included on the first substrate 250 and/or the second substrate 252.

In embodiments, the qubit device 210 and the additional qubit device 212 can include a transmon qubit 214 and an additional transmon qubit 216, respectively. The transmon qubit 214 and the additional transmon qubit 216 can be one or more of a variety of qubits. For example and without limitation, the transmon qubit 214 and the additional transmon qubit 216 can be flux-tunable qubits and/or phase qubits. The electrical filter 230 and the additional electrical filter 232 can include filters that can be tuned to reflect signals at a frequency of a transmon qubit 214 and the additional transmon qubit 216 (e.g., the qubit device 210 and the additional qubit device 212).

With embodiments, such as generally illustrated in FIG. 1, the non-limiting on-chip filtering system can include the voltage source 240 and the additional voltage source 242 coupled with the electrical filter 230 and the additional electrical filter 232, respectively. The voltage source 240 and the additional voltage source 242 can supply power/voltage to the electrode 220 and the additional electrode 222, via the electrical filter 230 and the additional electrical filter 232, respectively. Supplying voltage to the electrode 220 and the additional electrode 222 can shift the resonant frequency of one or more defects of the non-limiting, on-chip filtering system 100 to reduce TLS impact (e.g., interference and/or noise) on the qubit device 210 and the additional qubit device 212. With examples, the voltage source 240 and the additional voltage source 242 can supply a variety of voltages ranging from about −10V to about 10V (e.g., in small steps of about 10 mV or more or less). Additionally, the electrical filter 230 and the additional electrical filter 232 can reflect signals at the frequency of the qubit device 210 (e.g., the transmon qubit 214) and the additional qubit device 212 (e.g., the additional transmon qubit 216) such that outside noise originating from an environment exterior to the on-chip filtering system 100 does not affect performance of the transmon qubit 214 or the additional transmon qubit 216.

In examples, the first substrate 250 can be a qubit chip, whereby the first substrate 250 can include the qubit device 210 and the additional qubit device 212. The second substrate 252 can be an interposer chip that can include various circuity for supporting/controlling the qubit device 210 and the additional qubit device 212. Further, as indicated in FIG. 1, the first substrate 250 (e.g., the qubit chip) can be bump-bonded with the second substrate 252 (e.g., the interposer chip) via one or more bump-bonds 260, 262. The first substrate 250 can be bump-bonded with the second substrate 252 such that the first surface 270 of the first substrate 250 is proximate the third surface 274 of the second substrate 252. Further, the electrode 220 and the additional electrode 222 disposed on the second substrate 252 can be in close proximity to the qubit device 210 and the additional qubit device 212 disposed on the first substrate 250. With examples, the electrode 220 and the additional electrode 222 can be aligned (e.g., at least partially, or fully, overlapping) in at least one direction (e.g., vertically) with the qubit device 210 and the additional qubit device 212. The electrode 220 and the additional electrode 222 can be aligned in a first direction (e.g., a horizontal direction along the second substrate 252) with the electrical filter 230 and the additional electrical filter 232; and the electrode 220 and the additional electrode 222 can be aligned in a second direction (e.g., a vertical direction perpendicular to the first direction) with the transmon qubit 214 and the additional transmon qubit 216.

Figure 2:
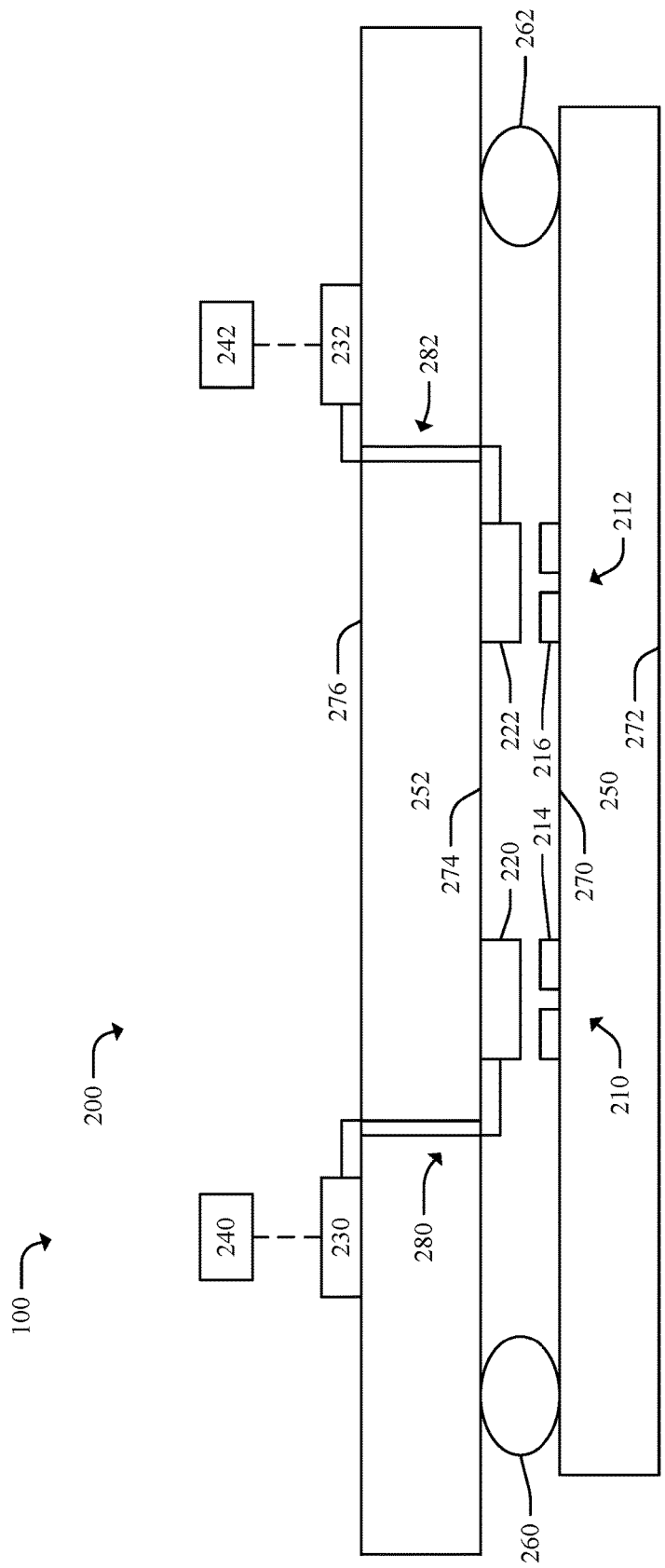
FIG. 2 illustrates a diagram of an example, non-limiting on-chip filtering system that can facilitate preventing qubit energy loss in accordance with one or more embodiments described herein.

Turning next to FIG. 2, the non-limiting, on-chip filtering system 100 to prevent qubit energy loss can include one or more of a variety of configurations. For example and without limitation, the electrical filter 230 and the additional electrical filter 232 can be disposed on a different surface than the electrodes 220, 222 and the qubit devices 210, 212. The electrical filter 230 and the additional electrical filter 232 can be disposed on the fourth surface 276 of the second substrate 252. The electrical filter 230 and the additional electrical filter 232 can be disposed on an opposite surface with respect to the electrode 220 and the additional electrode 222; further, the electrical filter 230 and the additional electrical filter 232 can be disposed on opposite sides of the second substrate 252.

With embodiments, the non-limiting, on-chip filtering system 100 to prevent qubit energy loss can include one or more thru substrate vias (TSVs) that can couple the electrical filter 230 to the electrode 220 and can couple the additional electrical filter 232 to the additional electrode 222, such that voltage can be applied through the second substrate 252. In examples, the electrical filter 230 and the additional electrical filter 232 can be disposed on an opposite side with respect to the electrode 220 and the additional electrode 222 to preserve wiring space and/or minimize interferences with the on-chip filtering system 100. The on-chip filtering system 100 can include a TSV 280 and an additional TSV 282.

In embodiments, such as generally illustrated in FIG. 2, the TSV 280 can electrically couple the voltage source 240 and the electrical filter 230 with the electrode 220 such that the voltage source 240 can supply a voltage to the electrode 220 to create an electric field within the vicinity (e.g., proximate) of the qubit device 210 to change the frequencies of the TLSs such as to not interfere with qubit device 210 performance (e.g., qubit T1). The additional TSV 282 can electrically couple the additional voltage source 242 and the additional electrical filter 232 with the additional electrode 222 such that the additional voltage source 242 can supply a voltage to the additional electrode 222 to create an electric field within the vicinity (e.g., proximate) of the additional qubit device 212 to change the frequencies of the TLSs such as to not interfere with additional qubit device 212 performance (e.g., qubit T1).

Figure 3:
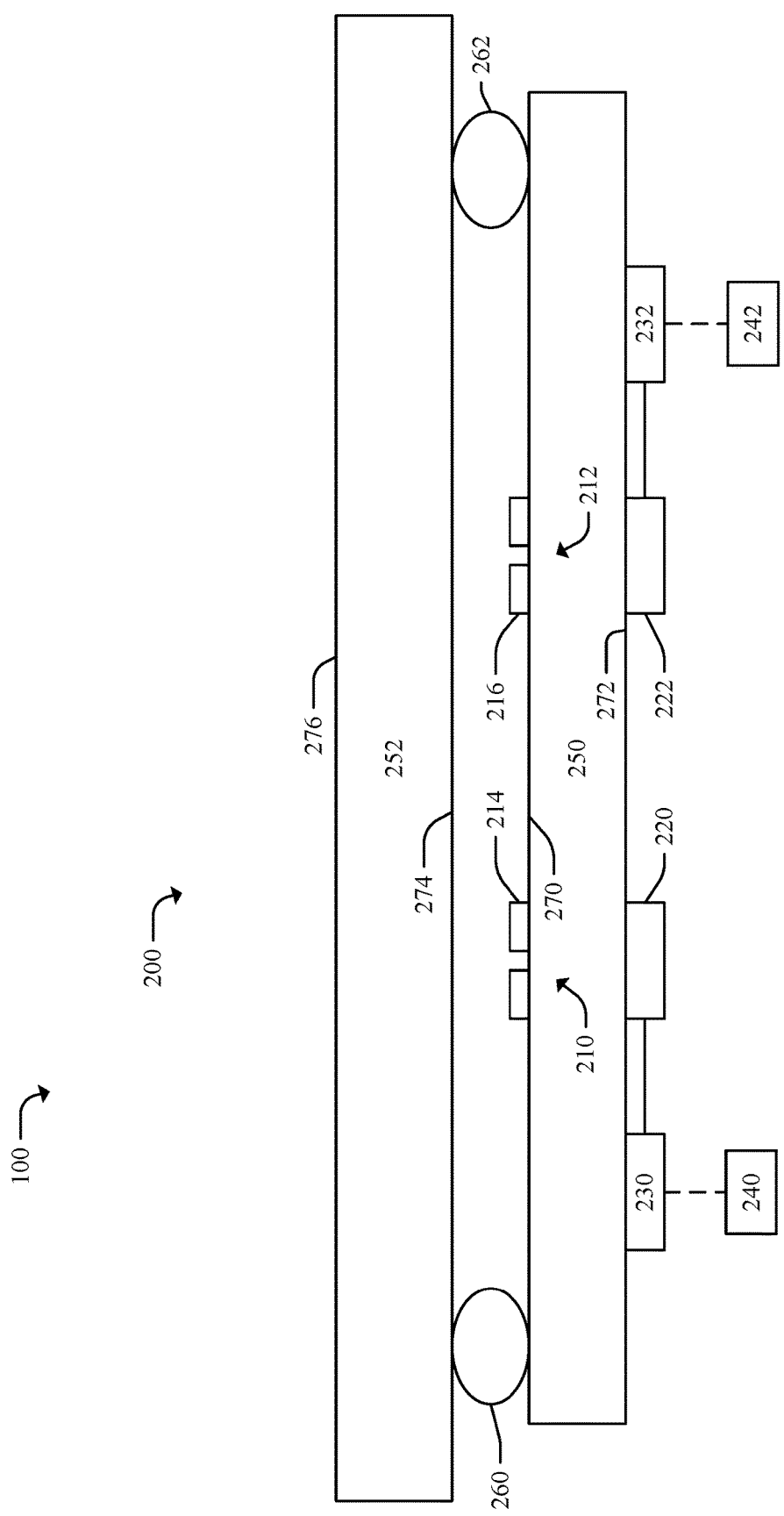
FIG. 3 illustrates a diagram of an example, non-limiting on-chip filtering system that can facilitate preventing qubit energy loss in accordance with one or more embodiments described herein.

Turning to FIG. 3, the non-limiting, on-chip filtering system 100 to prevent qubit energy loss can include a configuration where the qubit device 210, the electrode 220, and the electrical filter 230 can be disposed on the same substrate (e.g., the first substrate 250). Alternatively, in one or more various embodiments, the electrical filter 230 can be disposed on the second substrate 252. The qubit device 210 can be disposed on the first surface 270 of the first substrate 250; and the electrode 220 and the electrical filter 230 can be disposed on the second surface 272 of the first substrate 250. In a similar manner, the additional qubit device 212, the additional electrode 222, and the additional electrical filter 232 can be disposed on the same substrate (e.g., the first substrate 250). Alternatively, in one or more various embodiments, the additional electrical filter 232 can be disposed on the second substrate 252. The additional qubit device 212 can be disposed on the first surface 270 of the first substrate 250; and the additional electrode 222 and the electrical filter 232 can be disposed on the second surface 272 of the first substrate 250.

With embodiments, such as generally illustrated in FIGS. 1-3, the electrode 220 and the additional electrode 222 can be disposed less than about a quarter of a wavelength ($\lambda/4$) away from the electrical filter 230 and the additional electrical filter 232, respectively. The wavelength $\lambda$ can be determined by the frequency f of the qubit and the propagation velocity v of signals in the wiring according to $\lambda=v/f$. In examples, a quarter of a wavelength can be less than about 1 centimeter.

Figure 4:
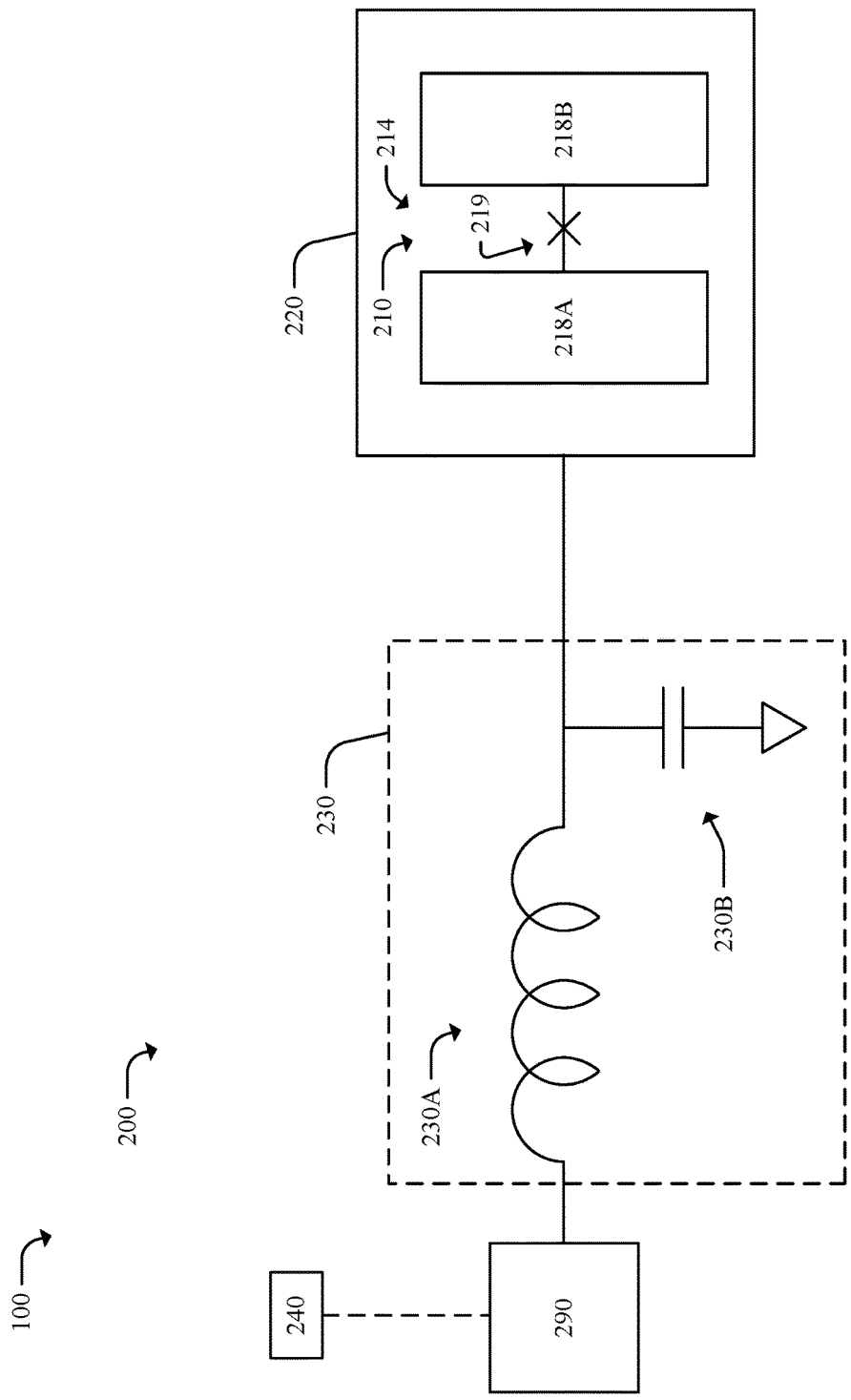
FIG. 4 illustrates a block diagram of an example, non-limiting on-chip filtering system that can facilitate preventing qubit energy loss in accordance with one or more embodiments described herein.

In embodiments, such as generally illustrated in FIG. 4, the on-chip filtering system 100 to prevent qubit energy loss can include an electrical filter 230. The electrical filter 230 can include one or more of a variety of components and/or types. For example and without limitation, the electrical filter 230 can be any type/arrangement of filter elements to result in a low-pass response with a cut-off frequency of about 1.5 GHz to about 2.0 GHz or more or less. That is, the frequency of the qubit device 210 (e.g., the transmon qubit 214) can be about 5 GHz, and the electrical filter 230 can be connected/selected to reject and reflect signals with frequencies higher than the filter cut-off frequencies, including the frequency of the qubit device 210.

With examples, the electrical filter 230 can be any variety of low loss filter and can be constructed from superconducting elements. Further, the electrical filter 230 can be a low pass filter, a band reject filter (e.g., consisting of an open-ended quarter-wave stub fabricated using coplanar waveguide circuity), and a combination of low pass and band reject filters (e.g., for a more complete rejection of energy leakage from the qubit and to protect the introduction of noise at both the qubit frequency and the resonator readout frequency.

In examples, the qubit device 210 can be a transmon qubit 214 and can further comprise a first capacitor plate 218A, a second capacitor plate 218B, and a Josephson junction 219, as shown in FIG. 4. The Josephson junction 219 can bridge the first capacitor plate 218A with the second capacitor plate 218B.

As illustrated in FIG. 4, the electrode 220 can be coupled (e.g., electrically) with the electrical filter 230 which can consist of an inductor 230A and a capacitor 230B. The electrical filter 230 can reject frequencies that are similar/near to the frequency of the qubit device 210 (e.g., frequencies greater than about 1.5 GHz). The electrical filter 230 can effectively prevent/limit energy of the qubit device 210 from leaving and can prevent noise from entering and disturbing the qubit device 210. With embodiments, the inductor 230A and the capacitor 230B can be one or more of a variety of inductors or capacitors used with quantum devices. For example, the inductor 230A can be a spiral inductor and the capacitor 230B can be implemented as a planar interdigitated capacitor. The filter components can be made from superconducting materials (e.g., niobium, aluminum, tantalum, titanium nitride, etc.) in order to avoid electrical dissipation. Additionally, the input of the electrical filter 230 can be coupled to external circuitry 290, which can include circuit boards, coaxial cables, and additional filters for the on-chip filtering system 100. The external circuitry 290 can be coupled to and/or can include the voltage source 240 that provides a voltage to the electrode 220 for tuning the frequencies of the TLSs.

In embodiments, the voltage source 240 can supply a voltage that can range from about −10V to about 10V to be applied to the electrode 220. The electrode 220 (e.g., the voltage source 240) can generate an electric field proximate the qubit device 210 that can change the frequencies of the TLSs such that an optimal voltage ($V_{opt}$) can be found to improve performance of the qubit device 210. The non-limiting, on-chip filtering system 100 to prevent qubit energy loss can adjust the voltage supplied to the electrode 220, via the voltage source 240, to improve performance of the qubit device 210 (e.g., to improve T1 of the qubit device 210) as TLS defect frequencies change/vary during operation of the non-limiting, on-chip filtering system 100 and the qubit device 210. The voltage source 240 can provide a sweep of voltages such that the qubit device 210 produces maximum T1 values (e.g., where qubit coherence time is improved) and can maintain performance of the qubit device 210 above a minimum performance value (e.g., $T1_{setpoint}$).

Alternatively, the voltage supplied by the voltage source 240 can be chosen to minimize the gate error rate of quantum gate operations.

Figure 5:
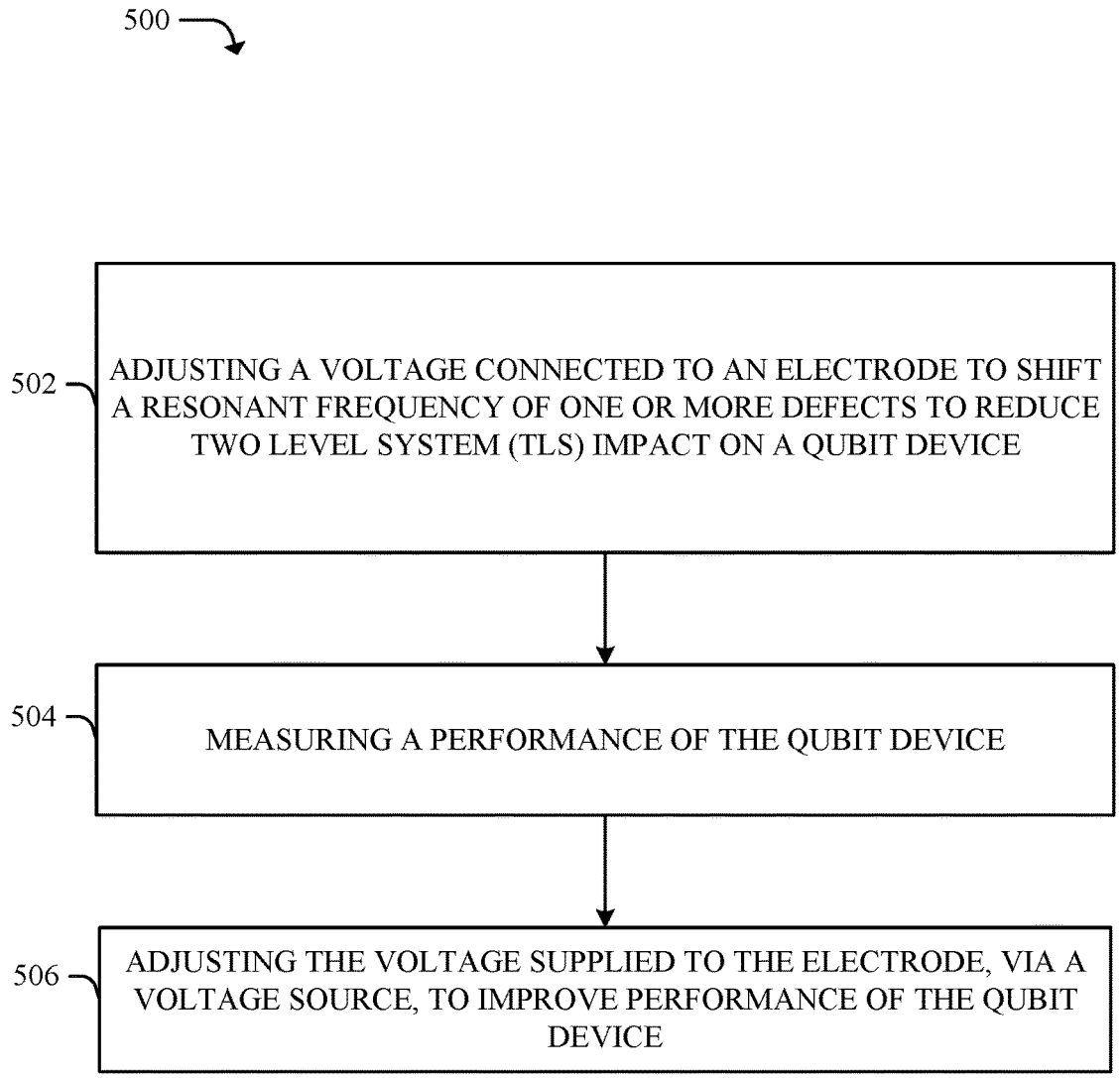
FIG. 5 illustrates a flow diagram of an example, non-limiting method that can facilitate on-chip filtering to prevent qubit energy loss in accordance with one or more embodiments described herein.

FIG. 5 illustrates a flow diagram of an example, non-limiting method 500 to facilitate on-chip filtering to prevent qubit energy loss in accordance with one or more embodiments described herein. Performance of the on-chip filtering system 100 can be improved with respect to measurement of the qubit relaxation time T1, where a minimum acceptable T1 value (e.g., T1 setpoint) can be set and the non-limiting method 500 can maintain qubit performance above the minimum acceptable T1 value. Repetitive description of like elements and/or processes employed in respective embodiments is omitted for sake of brevity.

At 502, the non-limiting method 500 to facilitate on-chip filtering to prevent qubit energy loss can comprise adjusting a voltage connected to an electrode 220 to shift a resonant frequency of one or more defects to reduce TLS impact on the qubit device 210.

At 504, the non-limiting method 500 to facilitate on-chip filtering to prevent qubit energy loss can comprise measuring a performance of the qubit device 210. In examples, performance can comprise a gate error rate and/or a T1 time.

At 506, the non-limiting method 500 to facilitate on-chip filtering to prevent qubit energy loss can comprise adjusting the voltage supplied to the electrode 220, via a voltage source 240, to improve performance of the qubit device 210.

Figure 6:
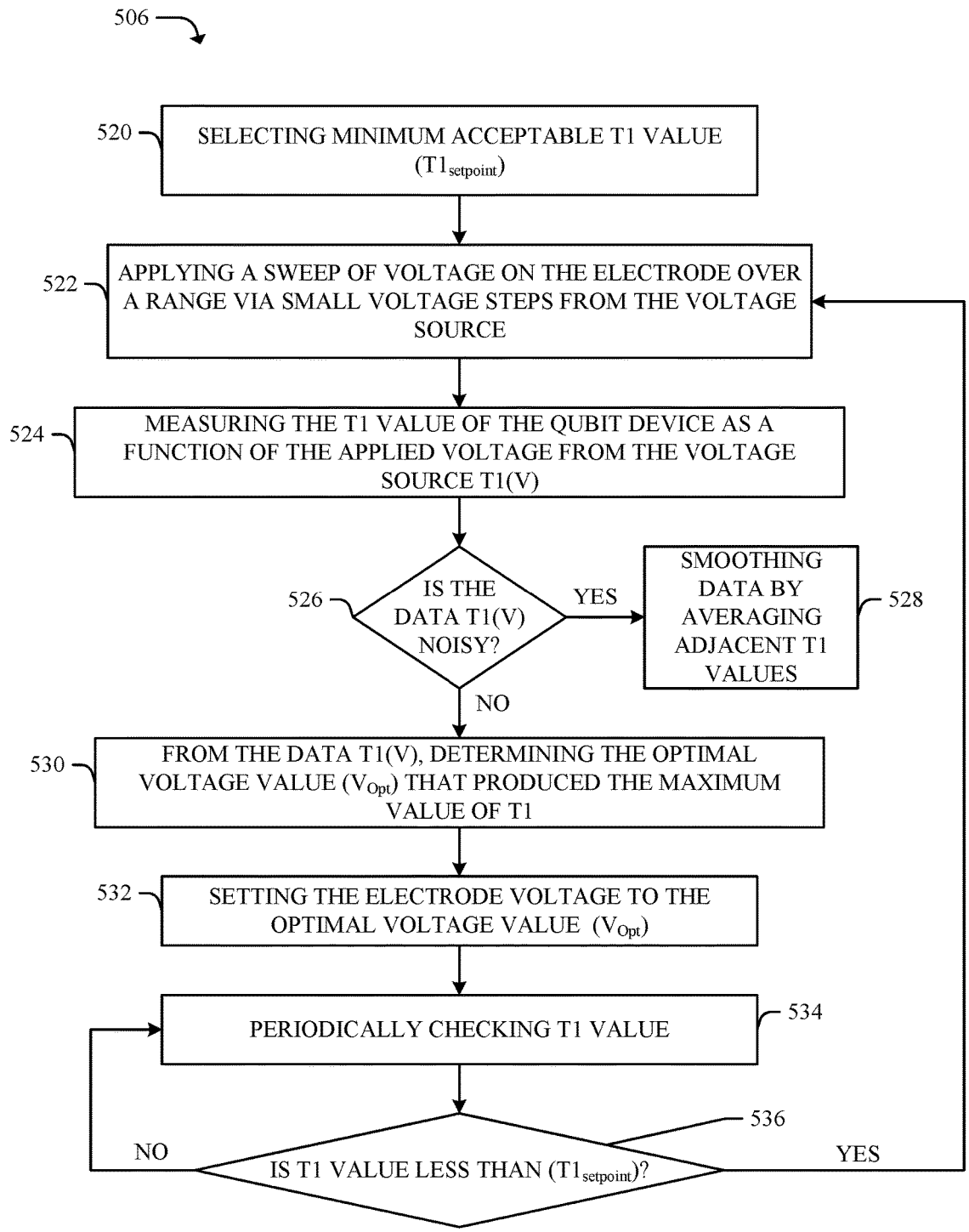
FIG. 6 illustrates a flow diagram of an example, non-limiting method that can facilitate on-chip filtering to prevent qubit energy loss by T1 value in accordance with one or more embodiments described herein.

Additionally, step 506 can further be described by the continued flowchart illustrated in FIG. 6. Adjusting the voltage supplied to the electrode 220 to improve performance of the qubit device 210 can comprise one or more of a variety of steps. For examples, at 520, the non-limiting method 500 can comprise selecting a minimum acceptable T1 value (e.g., T1$_{setpoint}$).

At 522, the non-limiting method 500 can comprise applying a sweep of voltages on the electrode 220 over a range (e.g., a range of −10V to +10V) via small voltage steps from the voltage source 240 (e.g., voltage steps of about 10 mV or more or less).

At 524, the non-limiting method 500 can comprise measuring the T1 value of the qubit device 210 as a function of the applied voltage from the voltage source 240 (e.g., T1(V)).

At 526, the non-limiting method 500 can comprise determining if the data (e.g., the T1(V)) is noisy. In response a determination of noisy data, at 528, the non-limiting method 500 can comprise smoothing the data by averaging adjacent T1 values over the data (e.g., T1(V)).

At 526, the non-limiting method 500 can determine the data is not noisy and can proceed to step 530 without performing step 528. Further, at 530, the non-limiting method 500 can comprise determining the optimal voltage value (V$_{Opt}$) that produced the maximum value of T1 based on the data (e.g., T1(V)).

At 532, the non-limiting method 500 can comprise setting the voltage of the electrode 220 to the optimal voltage value (V$_{Opt}$).

At 534, the non-limiting method 500 can comprise periodically checking the T1 value. Additionally, at 526, the non-limiting method 500 can comprise determining if the T1 value is less than the minimum acceptable T1 value (e.g., T1$_{setpoint}$). In response to a determination that the T1 value is not less than the T1 setpoint, the non-limiting method 500 can perform step 522 of applying a sweep of voltages to determine the optimal voltage value (V$_{Opt}$). If the T1 value is greater than the minimum acceptable T1 value, the non-limiting method 500 can continue to periodically check the T1 value to verify performance of the qubit device 210.

Figure 7:
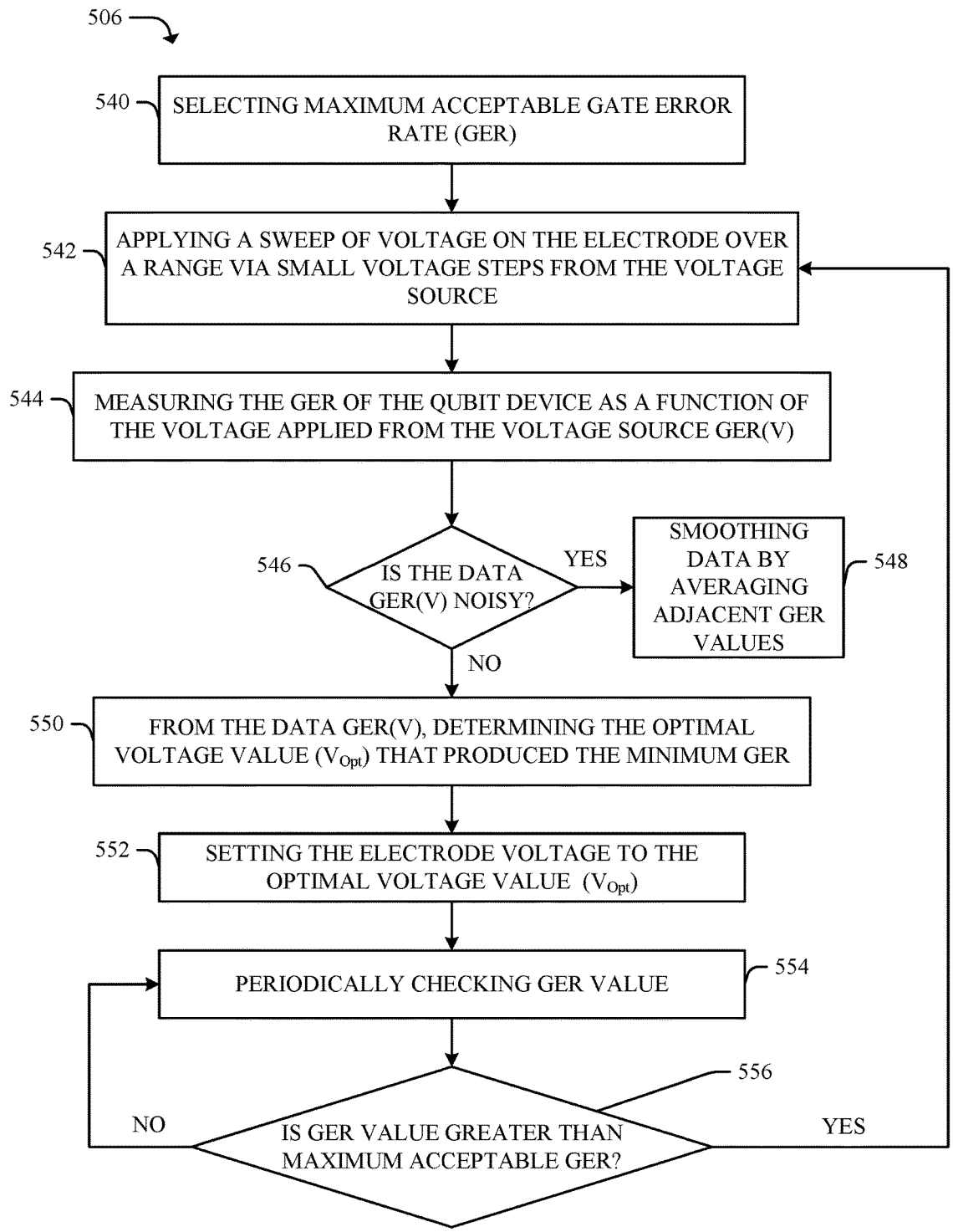
FIG. 7 illustrates a flow diagram of an example, non-limiting method that can facilitate on-chip filtering to prevent qubit energy loss by gate error rate in accordance with one or more embodiments described herein.

Additionally or alternatively, step 506 can further be described by the continued flowchart illustrated in FIG. 7. Adjusting the voltage supplied to the electrode 220 to improve performance of the qubit device 210 can comprise one or more of a variety of steps. For example, the variety of steps can involve evaluating a Gate Error Rate (GER) of the qubit device 210 (e.g., in contrast to evaluating performance based on T1 values). At 540, the method 500 can comprise selecting a maximum acceptable GER of the qubit device 210.

At 542, the non-limiting method 500 can comprise applying a sweep of voltages on the electrode 220 over a range (e.g., a range of −10V to +10V) via small voltage steps from the voltage source 240 (e.g., voltage steps of about 10 mV or more or less).

At 544, the non-limiting method 500 can comprise measuring the GER of the qubit device 210 as a function of the applied voltage from the voltage source 240 (e.g., GER(V)).

At 546, the non-limiting method 500 can comprise determining if the data (e.g., the GER(V)) is noisy. In response a determination of noisy data, at 548, the non-limiting method 500 can comprise smoothing the data by averaging adjacent GER values over the data (e.g., GER(V)).

At 546, the non-limiting method 500 can determine the data is not noisy and can proceed to step 550 without performing step 548. Further, at 550, the non-limiting method 500 can comprise determining the optimal voltage value (V$_{Opt}$) that produced the minimum value of GER based on the data (e.g., GER(V)).

At 552, the non-limiting method 500 can comprise setting the voltage of the electrode 220 to the optimal voltage value (V$_{Opt}$).

At 554, the non-limiting method 500 can comprise periodically checking the GER value. Additionally, at 556, the non-limiting method 500 can comprise determining if the GER value is less than the maximum acceptable GER value. In response to a determination that the GER value is greater than the maximum acceptable GER, the non-limiting method 500 can perform step 542 of applying a sweep of voltages to determine the optimal voltage value (V$_{Opt}$). If the GER value is less than the maximum acceptable GER value, the non-limiting method 500 can continue to periodically check the GER value to verify performance of the qubit device 210.

Aspects of the one or more embodiments described herein are described herein with reference to flowchart illustrations or block diagrams of methods, apparatus (systems), and devices according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a quantum device comprising:
        a qubit device on a substrate;
        an electrode placed in proximity to the qubit device;
        an electrical filter connected to the electrode, wherein the electrical filter comprises a filter tuned to reflect signals on the electrode from the qubit device at a frequency of a transmon qubit of the qubit device back towards the qubit device; and
        a voltage source connected to the electrode via the electrical filter, wherein the voltage source controls a voltage to the electrode to shift a resonant frequency of one or more defects to reduce two level system (TLS) impact on the qubit device.

2. The system of claim 1, wherein the filter is further tuned to reject signals on the electrode from a direction of the voltage source at the frequency of the transmon qubit of the qubit device.

3. The system of claim 1, wherein the voltage to the electrode is adjusted to improve performance of the qubit device.

4. The system of claim 1, wherein the qubit device is flux-tunable.

5. The system of claim 1, wherein the electrical filter is within $\lambda/4$ of the electrode, and wherein $\lambda$ is a defined function of the frequency of the transmon qubit.

6. The system of claim 1, wherein the electrical filter is comprised of superconducting materials.

7. A device comprising:
    a transmon qubit on a substrate;
    an electrode placed in proximity to the transmon qubit;
    an electrical filter connected to the electrode, wherein the electrical filter comprises a filter tuned to reflect signals on the electrode from the transmon qubit at a frequency of the transmon qubit back towards the transmon qubit; and
    a voltage source connected to the electrode via the electrical filter, wherein the transmon qubit is disposed on a first surface, and the electrode is disposed on a second surface.

8. The device of claim 7, wherein the first surface and the second surface are on opposite sides of the substrate.

9. The device of claim 7, wherein the second surface is on a second substrate.

10. The device of claim 7, wherein the electrical filter is disposed on the second surface.

11. The device of claim 7, wherein the electrode is aligned in at least one direction with the transmon qubit.

12. The device of claim 9, wherein the electrical filter is disposed on a third surface of the second substrate, and wherein the second surface and the third surface are on opposite sides of the second substrate.

13. The device of claim 7, wherein the electrical filter is within $\lambda/4$ of the electrode, and wherein $\lambda$ is a defined function of the frequency of the transmon qubit.

14. The device of claim 7, wherein the transmon qubit is flux-tunable.

15. The device of claim 7, wherein the filter is further tuned to reject signals on the electrode from a direction of the voltage source at the frequency of the transmon qubit.

16. A method comprising:
    adjusting, by a voltage source connected to an electrical filter that is connected to an electrode, a voltage to the electrode to shift a resonant frequency of one or more defects to reduce two level system (TLS) impact on a qubit device, wherein the electrode is located in proximity to the qubit device, wherein the electrical filter is located between the voltage source and the electrode, wherein the electrical filter is located on a same substrate as the electrode, wherein the electrical filter comprises a filter tuned to reflect signals on the electrode from the qubit device at a frequency of a transmon qubit of the qubit device back towards the qubit device.

17. The method of claim 16, further comprising:
    measuring a performance of the qubit device; and
    adjusting, by the voltage source, the voltage supplied to the electrode to improve the performance of the qubit device.

18. The method of claim 17, wherein the performance comprises a Gate Error Rate.

19. The method of claim 17, wherein the performance comprises a T1 time.

20. The method of claim 17, further comprising:
improving the performance of the qubit device by:
- applying, via the voltage source, a sweep of voltage on the electrode over a range via a plurality of small voltage steps;
- measuring a T1 value of the qubit device as a function of the voltage applied by the voltage source;
- determining an optimal voltage value that produced a maximum value for the T1 value for the qubit device; and
- setting the voltage of the electrode to the optimal voltage value.

21. The method of claim 17, further comprising:
improving the performance of the qubit device by:
- applying, via the voltage source, a sweep of voltage on the electrode over a range via a plurality of small voltage steps;
- measuring a gate error rate of the qubit device as a function of the voltage applied by the voltage source;
- determining an optimal voltage value that produced a minimum gate error rate for the qubit device; and
- setting the voltage of the electrode to the optimal voltage value.

* * * * *